United States Patent [19]

Pflanz et al.

[11] 4,443,854

[45] Apr. 17, 1984

[54] CURRENT SENSOR RESPONSIVE TO SYMMETRICAL AND ASYMMETRICAL CURRENTS AND CURRENT LIMITING PROTECTOR UTILIZING SAME

[75] Inventors: Herbert M. Pflanz; Albert B. Lester, both of Westwood, Mass.

[73] Assignee: Electric Power Research Institute, Inc., Palo Alto, Calif.

[21] Appl. No.: 271,580

[22] Filed: Jun. 8, 1981

[51] Int. Cl.³ ............................................. H02H 3/26
[52] U.S. Cl. .................................... 364/483; 361/76; 361/93; 361/94
[58] Field of Search ............... 364/483, 487, 813, 814, 364/817, 829; 361/76, 93, 94; 324/132, 133; 340/659, 664

[56] References Cited

U.S. PATENT DOCUMENTS

| | | | |
|---|---|---|---|
| 3,289,079 | 11/1966 | Ferguson | 364/483 X |
| 3,488,482 | 1/1970 | Ley | 364/483 |
| 3,914,667 | 10/1975 | Waldron | 361/94 |
| 3,970,901 | 7/1976 | Rohr | 361/94 X |
| 4,146,913 | 3/1979 | Sun | 361/76 |
| 4,208,692 | 6/1980 | Rohr | 361/93 X |
| 4,366,521 | 12/1982 | Jessee | 361/76 |

FOREIGN PATENT DOCUMENTS

| | | | |
|---|---|---|---|
| 2815089 | 6/1979 | Fed. Rep. of Germany | 340/659 |
| 527793 | 7/1977 | U.S.S.R. | 361/93 |
| 636708 | 12/1978 | U.S.S.R. | 361/93 |
| 665360 | 5/1979 | U.S.S.R. | 361/93 |

OTHER PUBLICATIONS

"The Current Limiting Protector (CLP)", Electric Power Research Institute Information Sheet, Apr. 1980, RP1142.
"Development and Testing of a Prototype Current Limiting Protector", Electric Power Research Institute, Dec. 1979, EPRI EL-1250.
Grandbois, G. "Quantize the Feedback . . . ", *Electronic Design*, vol. 26, (Mar. 1978), pp. 110–116.
Kono, M.; Iinuma, K.; and Kumagai, S., "Power and Energy Measurements of Transient Electric Discharge", *Review of Scientific Instruments*, vol. 49, No. 8, (Aug. 1978), pp. 1160–1162.

Primary Examiner—Errol A. Krass
Assistant Examiner—Clifford L. Tager
Attorney, Agent, or Firm—Flehr, Hohbach, Test, Albritton & Herbert

[57] ABSTRACT

A current limiting protector for use in electric power transmission lines includes a conductive strip of material and a chemical charge for physically interrupting the conductive strip in response to a fault current. A current sensor triggers the chemical charge when the line current is symmetrical and the RMS value of the line current exceeds a first value, and the current sensor triggers the chemical charge when the line current is asymmetrical and the RMS value of line current exceeds a second value.

8 Claims, 9 Drawing Figures

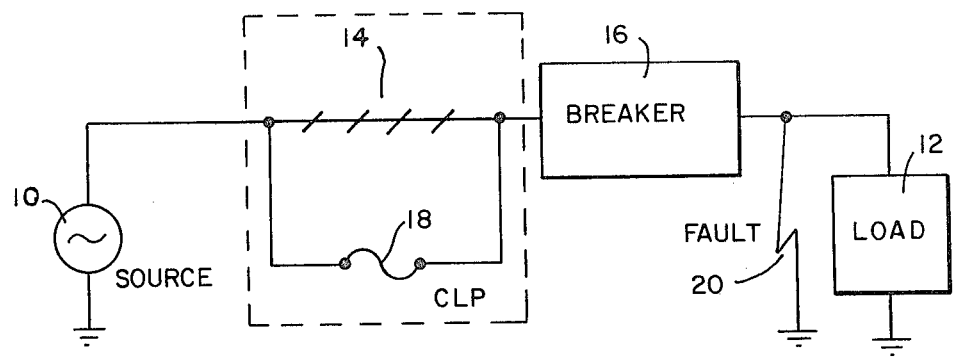
FIG.—1
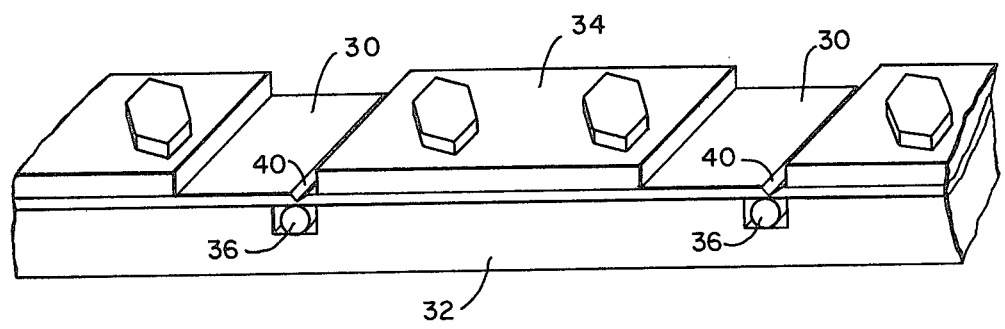
FIG.—2
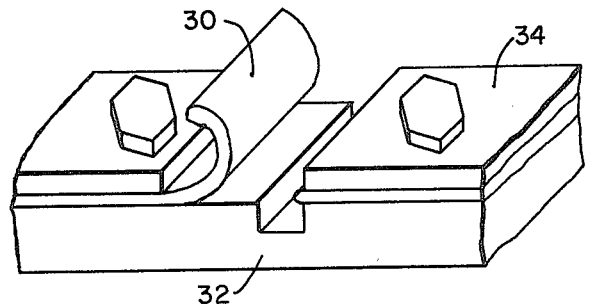
FIG.—3
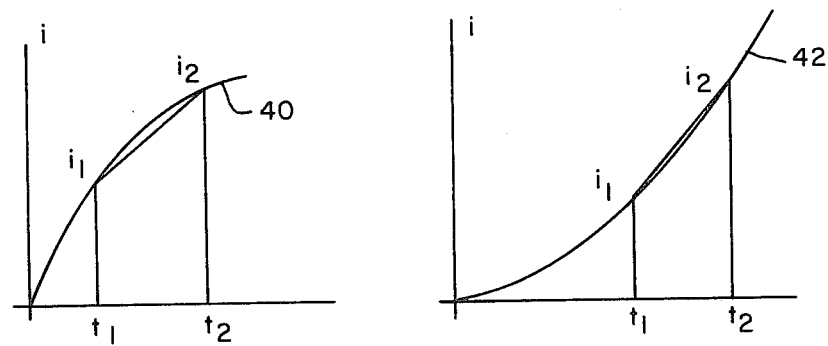
FIG.—4      FIG.—5

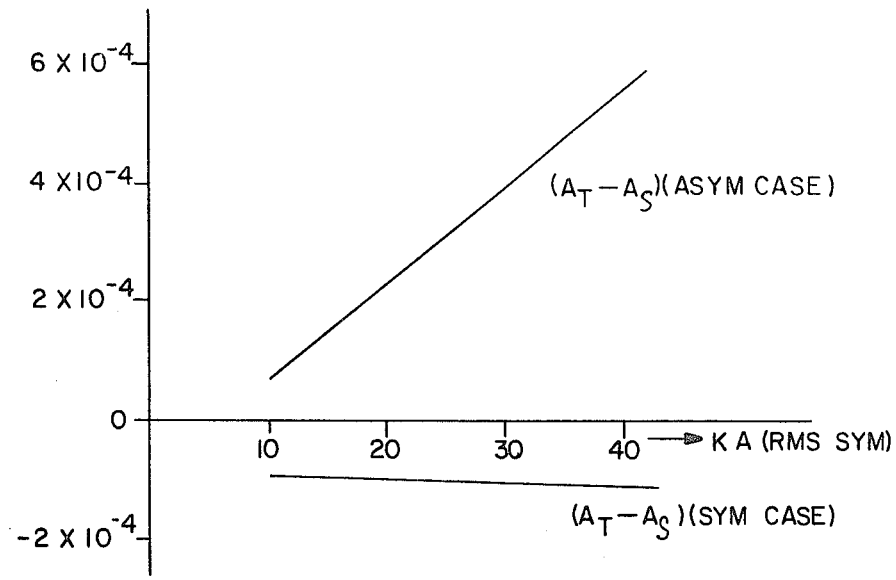
FIG.—6
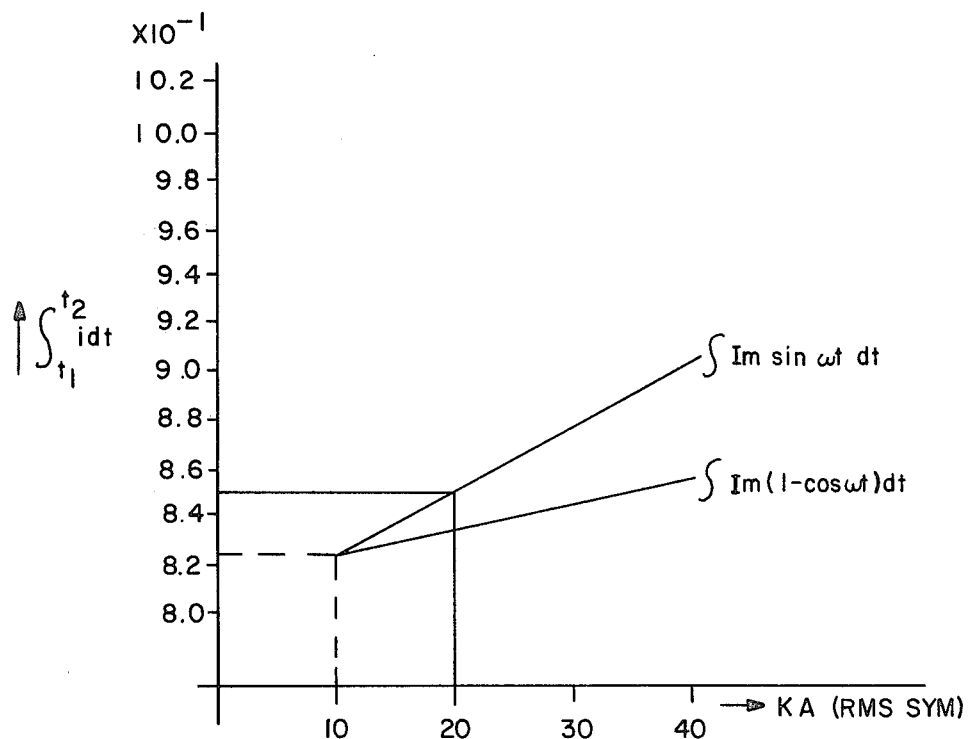
FIG.—7

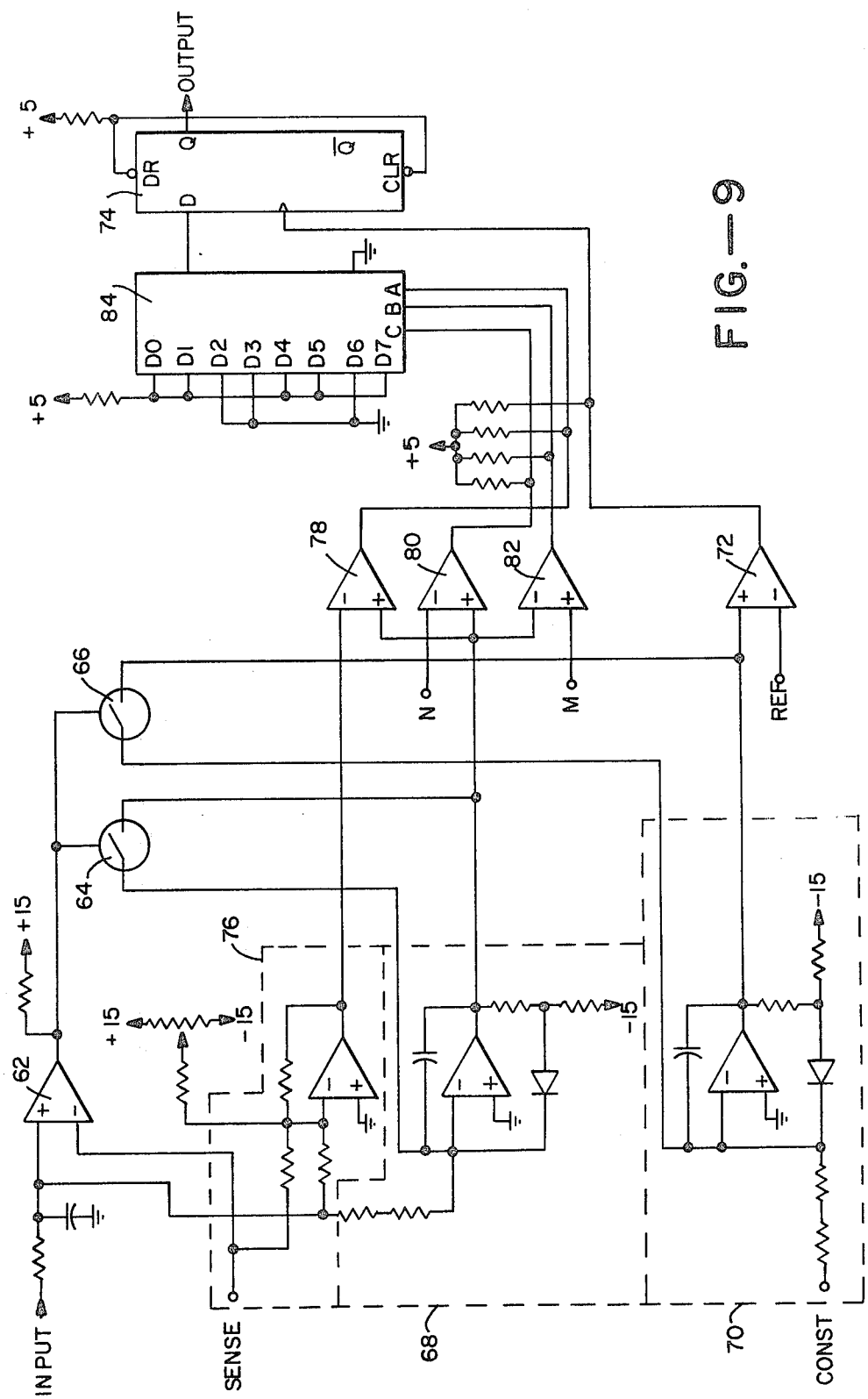
FIG.—9

CURRENT SENSOR RESPONSIVE TO SYMMETRICAL AND ASYMMETRICAL CURRENTS AND CURRENT LIMITING PROTECTOR UTILIZING SAME

This invention relates generally to electric power transmission and to devices for use therein, and more particularly the invention relates to current sensors and current breakers for use in electric power transmission and distribution lines.

Current limiting fuses are used in electric power lines to limit line current. Such fuses are connected in series in the line and limit short circuit current while permitting normal currents to flow unimpeded. Unfortunately, the maximum continuous current capacity of such fuses, while still providing low let through current characteristics, is limited.

The current limiting protector has been developed for applications where high continuous current capability in the range of 1000 to 2000 amperes is required and yet a low let-through current under short circuit conditions of typically less than 15000 ampere is desirable. The current limiting protector comprises a metal conductive strip which carries the continuous current in parallel with a current limiting fusible element.

When a fault occurs, a current level sensor triggers strategically located chemical charges that pyrotechnically cut gaps in the metal conductor, thus diverting the fault current into the fusible element where it is interrupted in the normal manner.

Heretofore, the current level sensor senses an instantaneous current level only. Thus, a larger or a small short circuit current would be sensed regardless of the ultimate magnitude and the current limiting protector would be activated once the instantaneous current exceeds the sensing level. Generally, the current limiting protector is applied in series with other protective equipment such as a circuit breaker since it is more economical for the circuit breaker to interrupt all small short circuit currents within its rating with the current limiting protector responsive to and interrupting all faults with higher fault currents.

An object of the present invention is an improved sensing and trip system for a current limiting protector.

Another object of the invention is a current limiting protector which is responsive to the root mean square (RMS) value of a fault current.

A feature of the invention is a high speed current discriminating and sensing circuit responsive to the shape of a fault current for triggering a current limiting protector.

Briefly, in accordance with the invention a current limiting protector is provided which can be triggered at different current levels depending on whether the sensed current is symmetrical or asymmetrical. A current sensor and the current limiting protector in accordance with the invention is responsive to a current above the preselected level and provides an integration of the current over a period of time after the preselected current level is sensed. The integrated value is compared with a trapezoid current value over the same time period to determine if the current is symmetrical or asymmetrical. Different trigger levels are established for asymmetrical and symmetrical currents, respectively, whereby an asymmetrical current requires a greater symmetrical RMS current component to trigger the current limiting protector. Accordingly, the current limiting protector can be made responsive only to the high currents which cannot be cleared by the circuit breaker, and replacement costs for the current limiting protector and circuit outages are minimized.

Importantly, the current sensor can sense symmetry and assymetry and compute a trigger level in a time period on the order of 100–300 microseconds.

The invention and objects and features thereof will be more readily apparent from the following detailed description and appended claims when taken with the drawing, in which:

FIG. 1 is an electrical schematic of an electrical transmission line including a current limiting protector in accordance with the invention.

FIG. 2 is a perspective view of a portion of the main conductor of the current limiting protector prior to a fault current.

FIG. 3 is a perspective view of a portion of the main conductor of the current limiting protector of FIG. 2 after a fault current.

FIG. 4 is a plot of a portion of a symmetrical current and a trapezoidal area for comparison.

FIG. 5 is a plot of a portion of an asymmetrical current and a trapezoidal area for comparison.

FIG. 6 is a plot of trapezoidal area less current area for the symmetrical and asymmetrical currents of FIGS. 4 and 5.

FIG. 7 is a plot of the integral of the asymmetrical current versus the RMS symmetrical short circuit current, or the symmetrical component of the asymmetrical short circuit current.

FIG. 9 is a detailed schematic of the fault current sensor of FIG. 8.

Figure 8:
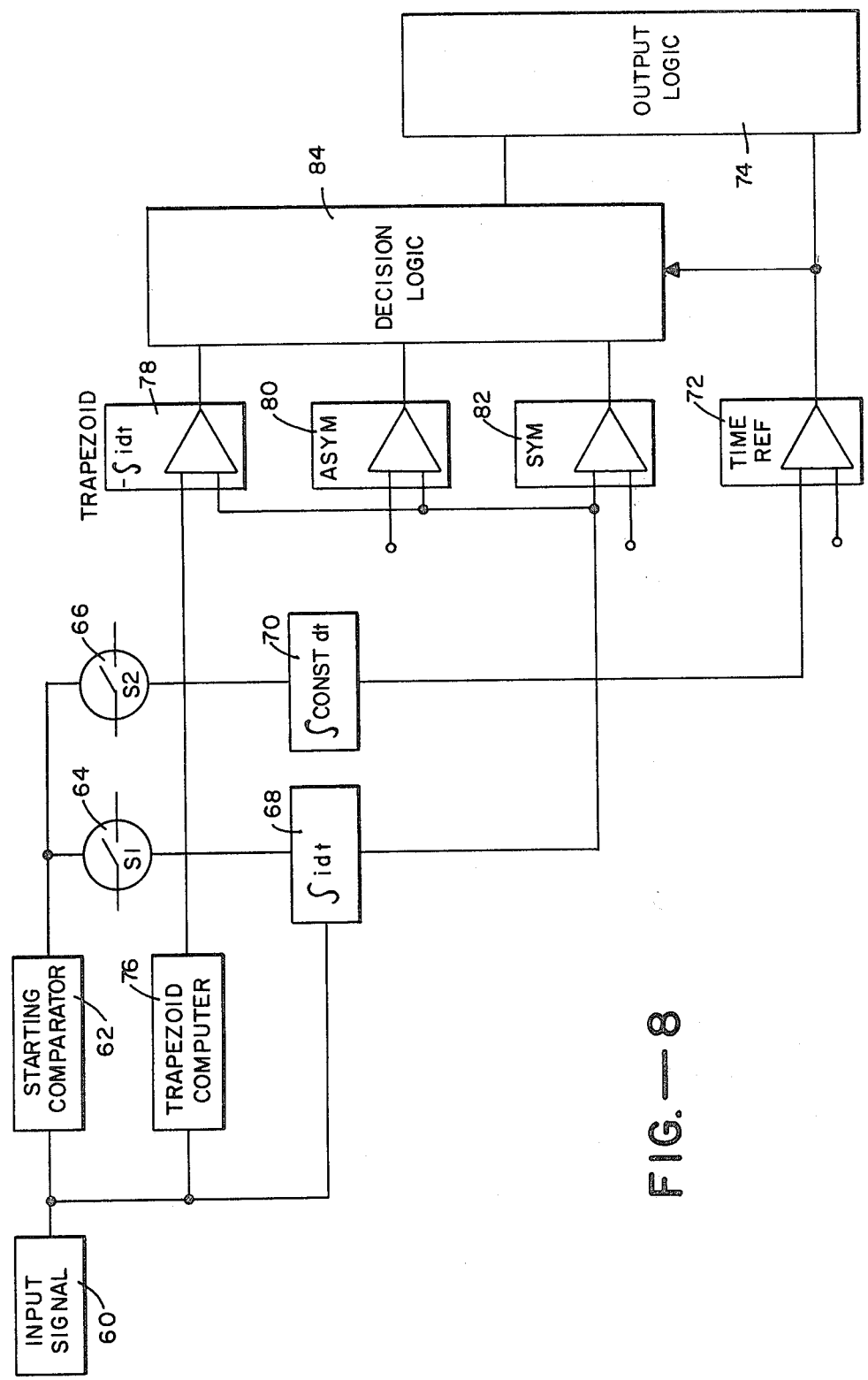
FIG. 8 is a functional block diagram of a fault current sensor in accordance with the invention.

Referring now to the drawings, FIG. 1 is an electrical schematic of an electrical power transmission system including a source 10 and a load 12 with a current limiting protector 14 and a circuit breaker 16 serially connected in the transmission line between the source and the load. As described above, the current limiting protector 14 contains a parallel current limiting fuse element 18 whereby the main conductor of the current limiting protector carries the normal line currents and responds to an excessive or fault current due to a fault 20 by directing the line current through the fusible element 18. Further, the current limiting protector 14 is connected in series with the breaker 16 whereby smaller fault currents will be interrupted by the breaker 16 without triggering the current limiting protector 14. Since the current limiting protector is a one shot device, i.e. the current limiting protector must be replaced after each trigger thereof, longer use of a current limiting protector and less down time of the transmission line are experienced by utilizing the breaker 16 to interrupt excess currents of a lower magnitude due to fault 20.

As above described, current limiting fuses cannot handle continuous currents above approximately 100 amperes and still provide low let through current characteristics. On the other hand, the current limiting protector can handle high continuous currents typically as high as 1,000 or 2,000 amperes and yet limit the let through currents under short circuit conditions to less than 15,000 amperes. When a fault occurs, a current level sensor triggers strategically located chemical charges that pyrotechnically cut gaps in the copper conductor of the current limiting protector thus diverting the fault current to the fuse where it is interrupted in the normal manner.

Heretofore, the current is sensed independently and the current limiting protector has been triggered in response to the instantaneous load current exceeding a preselected level.

FIG. 2 is a perspective view of a portion of the current limiting protector 14 and shows the metal strip 30, typically copper, which is mounted on a nonconducting support member 32 by means of metallic plates 34 which are bolted to support member 32. The chemical charges 36 are provided in recessed portions of support member 32 under the strip 30 near a support member 34. The conductive layer 30 may be notched as shown at 40 to facilitate a rupture of the metal strip. As above described, in response to a sensed fault current, an electrical signal is applied to trigger the chemical charges 36 and disrupt the metal layer 30 as shown in FIG. 3. Thus, the explosive chemical charges instantaneously disrupt the current path through the conductive strip 30 thereby diverting current through the fuse 18 in FIG. 1.

In accordance with one embodiment of the present invention a fault current sensor is provided which responds to the root mean square (RMS) value of the fault current and can be responsive to different current values depending on whether the fault current is symmetrical or asymmetrical. In determining whether the fault current is asymmetrical or symmetrical, the integral of the current between two time periods is compared with the average of the current or the trapezoid area formed by the corresponding currents at the two time periods, as illustrated in FIGS. 4 and 5. In FIG. 4, a symmetrical current 40 is illustrated and the current curve is convex between the two time periods $t_1$ and $t_2$. Thus, the integral of the actual current line 40 between $t_1$ and $t_2$ will be greater than the trapezoidal area defined by the current $i_1$ at $t_1$ and the current $i_2$ at $t_2$. Conversely, as shown in FIG. 5 an asymmetrical current line 42 is concave between the time periods $t_1$ and $t_2$. Thus, the integral of the actual current line 42 between $t_1$ and $t_2$ will be less than the trapezoidal area defined by the points $i_1$ and $i_2$ at times $t_1$ and $t_2$.

This is illustrated as follows:

$$\text{Area trapezoid} = A_T = \frac{i_1 + i_2}{2}(t_2 - t_1)$$

$$\text{Area Current (Sym)} = A_f = I_M \int_{t_1}^{t_2} \sin \omega t \, dt$$

$$\text{Area Current (Asym)} = A_f = I_M \int_{t_1}^{t_2} (1 - \cos \omega t) \, dt$$

Thus in the two cases we find for the difference of the respective areas:

Symmetrical Current:

$$A_T - A_f = \frac{i_1 + i_2}{2}(t_2 - t_1) -$$

$$\int_{t_1}^{t_2} I_M \sin \omega t \, dt = \text{NEGATIVE}$$

Asymmetrical Current:

$$A_T - A_f = \frac{i_1 + i_2}{2}(t_2 - t_1) -$$

-continued $$\int_{t_1}^{t_2} I_M(1 - \cos \omega t) \, dt = \text{POSITIVE}$$

As shown in FIG. 6 the area difference for the asymmetrical case is positive while the area difference for the symmetrical case is negative.

FIG. 7 is a plot of the symmetrical integral and the asymmetrical integral and illustrates that the symmetrical integral is correspondingly larger. That is, for any given value of current the integral of current is higher for the symmetrical current than for the asymmetrical current. Thus, it is seen that if a firing level is set on the basis of RMS symmetrical current, the current limiting protector will not be triggered on an asymmetrical current having a symmetrical component of the same magnitude.

FIG. 8 is a functional block diagram of a fault current sensor in accordance with the invention which distinguishes between symmetrical and asymmetrical currents. An input signal at 60 is derived from the instantaneous line current by means of a current transformer connected to the power line and the input signal is compared with a preselected current level in comparator 62. Only when the input signal exceeds the preselected value in comparator 62 is the current sensor operation initiated. The preselected value is set at a level such that the normal operating current will not be reached.

When the input signal exceeds the preselected value, as determined by comparator 62, the switches 64 and 66 are opened to initiate the timing and integration functions. The opening of switches 64 and 66 starts integration of the input signal at 68. A timing signal is provided by the integration of a constant at 70, and this time period is applied to a time reference comparator 72 which defines the time interval for the integration in the output logic 74. The trapezoidal area computation is provided at 76, and the output from the computation of 76 is compared with the current integration in the comparator 78. The output of comparator 78, either positive or negative, gives an indication of an asymmetrical or symmetrical current input signal. Assuming an asymmetrical signal, the integrated current wave is compared with a reference level for the asymmetrical current in comparator 80.

Assuming that the current is symmetrical, the current integration is compared with a symmetrical reference level in comparator 82. Thus, the decision logic 84 responds to a positive or negative input from 78 indicative of symmetry or asymmetry of the current wave, and then responds to either the asymmetrical comparator 80 or the symmetrical comparator 82 at the end of the selected time interval, established by the time reference 72, whereby the output logic 74 causes a trigger signal to be applied to the current limiting protector when the selected reference level is exceeded.

FIG. 9 is a detailed schematic of the fault current sensor of FIG. 8, and like elements have the same reference numerals.

The outputs from comparators 78, 80, and 82 are used as select lines to the multiplexer 84. The multiplexer is used as a function generator and produces an output which is the input to flip-flop 74. The flip-flop is triggered when clocked if the current limiting protector is to be operated. In one embodiment the following components were used:

| Component | Part Number |
| --- | --- |
| Integrators | LM 148J |
| Comparators | 72, 78, 80, 82 LM 139J |
| Comparators | 62, 68, 70, 76 One LM111J |
| Multiplexers | DM 74151 |
| Flip-flop | DM 7474 |

The current limiting protector in accordance with the present invention provides more selective response to fault currents whereby maintenance is reduced and down time of the electric power transmission lines is minimized. The current sensor is fast acting in determining current symmetry or asymmetry and determining trigger levels. While the illustrated embodiment determines symmetry by integration of current and comparison with a trapezoidal area, symmetry can be determined by other means such as determining and comparing the differential quotient at two points along the current wave. Similarly, the simple time integration of current can be replaced by the integral of the square of the current, thereby giving a true RMS value.

Thus, while the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A fault current sensor responsive to excess current comprising
   first means for determining symmetry and asymmetry of a current wave,
   second means for determining a measure of the root mean square of said current wave, said first means for determining symmetry and asymmetry of a current wave comprising integration means for integrating said current wave over a period of time after current exceeds a preset level, a trapezoid computation means for computing a trapezoidal area defined by said line current at the beginning of said time period and at the end of said time period, and means for comparing the output of said integration means and the output of said trapezoid computation means,
   comparison means operably connected with said second means for comparing said measure of said current wave with first and second reference potential levels for a symmetrical line wave and an assymetrical line wave, respectively, and
   logic means operably connected with said first means and said comparison means and responsive to symmetry and asymmetry of said line wave and to said comparison means for generating a signal indicating a fault.

2. A current sensor for use with a high speed circuit breaker comprising
   first comparator means for comparing a line current with a reference value,
   a first integration means for integrating said line current over a period of time after current exceeds a preset level,
   means for initiating said first integration means in response to said first comparator,
   timing means for establishing a time period for integration of said line current by said first integration means,
   a trapezoid computation means for computing a trapezoidal area defined by said line current at the initiation of said first integration means and said line current at the end of said time period,
   second comparator means for comparing the output of said trapezoid computation means and the output of said first integration means at the end of said time period and generating a positive or a negative signal in response to the comparison,
   third comparison means for comparing the output of said first integration means with first and second references and generating first and second signals in response to the comparisons, and
   logic means responsive to the output of said second comparator means and said third comparator means for generating a trigger signal.

3. A current sensor as defined by claim 2 wherein said second comparator means generates a first signal indicative of said line wave being symmetrical and a second signal indicative of said line wave being asymmetrical.

4. A current sensor as defined by claim 3 wherein said third comparator means comprises a first symmetrical current comparator for comparing the output of said integration means with a first voltage level and generating a first signal in response thereto, and a second asymmetrical current comparator for comparing the output of said integration means with a second voltage level and generating a second signal in response thereto.

5. A current sensor as defined by claim 4 wherein said first comparator compares the output of said first symmetrical current integration means with a first reference indicative of a trigger level for a symmetrical line wave and said second asymmetrical current comparator compares the output of said first integration means with a second reference indicative of a trigger level for an asymmetrical line wave.

6. A current sensor as defined by claim 5 wherein said logic means selectively responds to said first symmetrical current comparator and said second asymmetrical current comparator in response to said second comparator means.

7. A current sensor as defined by claim 6 wherein said timing means comprises a second integration means responsive to said first comparator means for integrating a constant value, and a fourth comparator means for comparing the output of said second integration means with a reference voltage to establish said time period.

8. A current limiting protector comprising
   a strip of conductive material,
   means for physically interrupting said strip of conductive material, and
   a fault current sensor for triggering said means for physically interrupting said strip of conductive material, said fault current sensor including
   first means for determining symmetry and asymmetry of a current wave,
   first means for determining symmetry and asymmetry of a current wave comprising integration means for integrating said current wave over a period of time, a trapezoid computation means for computing a trapezoidal area defined by said line current at the beginning of said time period and at the end of said time period, and means for comparing the output of said integration computation means and the output of said trapezoid computation means, second means for computing a measure of the root mean square of said current wave, comparison means operably connected with said second means for comparing said measure of the root mean square of said current wave with first and second reference potential levels for a symmetrical line wave and an assymetrical line wave, respectively, and logic means operably connected with said first means and said comparison means and responsive to symmetry and asymmetry of said line wave and to said comparison means for selectively triggering said means for physically interrupting said strip of conductive material.

* * * * *